(12) United States Patent
Seok

(10) Patent No.: US 9,402,240 B2
(45) Date of Patent: Jul. 26, 2016

(54) METHOD OF OPERATION IN WIRELESS LOCAL AREA NETWORK SYSTEM AND APPARATUS SUPPORTING THE SAME

(71) Applicant: LG ELECTRONICS INC., Seoul (KR)

(72) Inventor: Yong Ho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 14/165,282

(22) Filed: Jan. 27, 2014

(65) Prior Publication Data

US 2014/0211703 A1  Jul. 31, 2014

Related U.S. Application Data

(60) Provisional application No. 61/757,243, filed on Jan. 28, 2013.

(51) Int. Cl.
| | |
|---|---|
| *H04W 4/00* | (2009.01) |
| *H04W 52/36* | (2009.01) |
| *H04W 72/04* | (2009.01) |
| *H04W 52/22* | (2009.01) |
| *H04W 52/54* | (2009.01) |

(52) U.S. Cl.
CPC .......... *H04W 52/367* (2013.01); *H04W 52/226* (2013.01); *H04W 52/54* (2013.01); *H04W 72/042* (2013.01); *H04W 72/0406* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2007/0189256 A1* | 8/2007 | Oh ................................. | 370/338 |
| 2008/0014934 A1* | 1/2008 | Balasubramanian . | H04W 48/16 455/434 |
| 2009/0323608 A1* | 12/2009 | Adachi et al. ................. | 370/329 |
| 2011/0188486 A1* | 8/2011 | Kim et al. ..................... | 370/338 |

* cited by examiner

*Primary Examiner* — Jutai Kao
(74) *Attorney, Agent, or Firm* — Birch, Stewart, Kolasch & Birch, LLP

(57) ABSTRACT

A method of operating in a wireless local area network system is provided. The method includes receiving a channel usage response from an access point, the channel usage response comprising channel usage information and transmit power regulation information, the channel usage information being for coexistence with an infrastructure network, and operating by using the channel usage information. The channel usage information includes at least one channel entry field indicating at least one recommended channel and a usage mode field indicating usage of the at least one recommended channel listed in the at least one channel entry field. The transmit power regulation information includes a plurality of maximum transmit power fields. Each of maximum transmit power field specifies a maximum transmit power limit for transmission on a corresponding channel bandwidth.

10 Claims, 16 Drawing Sheets

| Octets: | 1 | 1 | 1 | 1 | 0 or 1 | 0 or 1 | 0 or 1 | 1360 |
|---|---|---|---|---|---|---|---|---|
| | Element ID | Length | Transmit Power Information | Local Maximum Transmit Power for 20MHz | Local Maximum Transmit Power for 20MHz | Local Maximum Transmit Power for 20MHz | Local Maximum Transmit Power for 160/80+80MHz | |
| | 1381 | 1382 | 1383 | 1384 | 1385 | 1386 | 1387 | |

METHOD OF OPERATION IN WIRELESS LOCAL AREA NETWORK SYSTEM AND APPARATUS SUPPORTING THE SAME

CROSS-REFERENCE TO RELATED APPLICATIONS

This application claims the benefit of priority of U.S. Provisional application 61/757,243 filed on Jan. 28, 2013, which is incorporated by reference in their entirety herein.

BACKGROUND OF THE INVENTION

1. Field of the Invention

The present invention relates to a wireless local area network system, and more particularly, to a method for operating a station in a wireless local area network system.

2. Related Art

With the recent development of information communication technology, a variety of wireless communication techniques have been developed. Among them, WLAN is a technology for wirelessly accessing the Internet at homes or companies or in specific service providing areas using mobile terminals, such as a Personal Digital Assistant (PDA), a laptop computer, and a Portable Multimedia Player (PMP), based on radio frequency technology.

As WLAN is actively propagated and applications employing WLAN are diversified, a next-generation WLAN system has been recently developed and introduced in order to support a High Throughput (HT) having a data processing speed of 540 Mbps or higher supported by IEEE 802.11n standard. The next-generation WLAN system is capable of supporting a Very High Throughput (VHT) having a data processing speed of 1 Gbps or higher. To achieve such a high data processing speed, the next-generation WLAN system adopts a wider channel bandwidth of up to 160 MHz, a higher frequency band (ex. 5 GHz band), a downlink Multi User-Multiple Input Multiple Output MU-MIMO) technique, a constellation mapping technique using 256-Quadrature Amplitude Modulation (QAM), etc.

The next-generation WLAN system is also capable of supporting a frame exchange between stations, regardless of a frame exchange with an access point. There might arise the need to share channel use information so that a frame exchange between stations can be properly supported depending on channels or channel bandwidth characteristics.

SUMMARY OF THE INVENTION

The present invention has been made in an effort to provide a method for operating a station in a WLAN system and an apparatus supporting the same.

In an aspect, a method of operating in a wireless local area network system is provided. The method includes receiving a channel usage response from an access point, the channel usage response comprising channel usage information and transmit power regulation information, the channel usage information being for coexistence with an infrastructure network, and operating by using the channel usage information. The channel usage information includes at least one channel entry field indicating at least one recommended channel and a usage mode field indicating usage of the at least one recommended channel listed in the at least one channel entry field. The transmit power regulation information includes a plurality of maximum transmit power fields. Each of maximum transmit power field specifies a maximum transmit power limit for transmission on a corresponding channel bandwidth.

The transmit power regulation information may further include a transmit power information field. The transmit power information field may be configured a number related to a number of the plurality of maximum transmit power fields.

The usage mode field may indicate either a usage for non-infrastructure network or a usage for off-channel TDLS (Tunneled Direct Link Setup) direct link as the usage of the recommended channels.

The method may further include transmitting a channel usage request to the access point for requesting the channel usage information. The channel usage request may include a requested usage mode field identifying a request usage mode.

The plurality of maximum transmit power fields comprises at least one fields among a maximum transmit power field for 20 MHz, a maximum transmit power field for 40 MHz, a maximum transmit power field for 80 MHz, and a maximum transmit power field for 160 MHz.

The channel usage response may be transmitted in a probe response frame.

The channel usage response may be transmitted in a channel usage response frame.

In another aspect, a wireless apparatus operating in a wireless local area network system is provided. The wireless apparatus includes a transceiver transmitting and receiving radio signals and a processor operatively coupled to the transceiver. The processor is configured for receiving a channel usage response from an access point, the channel usage response comprising channel usage information and transmit power regulation information, the channel usage information being for coexistence with an infrastructure network, and operating by using the channel usage information. The channel usage information includes at least one channel entry field indicating at least one recommended channel and a usage mode field indicating usage of the at least one recommended channel listed in the at least one channel entry field. The transmit power regulation information includes a plurality of maximum transmit power fields. Each of maximum transmit power field specifies a maximum transmit power limit for transmission on a corresponding channel bandwidth.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF EXEMPLARY EMBODIMENTS

Figure 1:
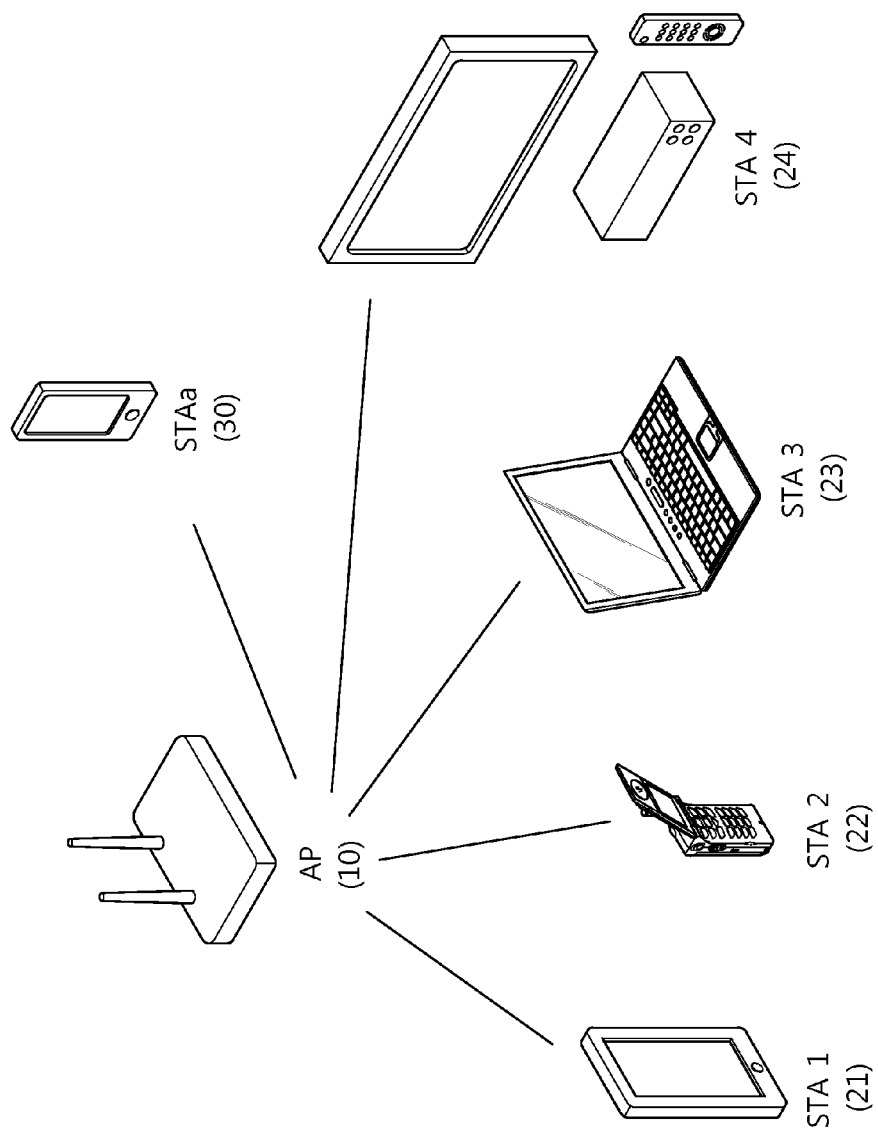
FIG. 1 is a view illustrating the configuration of a typical Wireless Local Area Network (WLAN) system to which an embodiment of the present invention may apply.

FIG. 1 is a view illustrating the configuration of a typical Wireless Local Area Network (WLAN) system to which an embodiment of the present invention may apply.

Referring to FIG. 1, the WLAN system includes one or more Basic Service Sets (BSS). The BSS is a set of stations (STAs) which can be successfully synchronized and communicate with each other, but is not a concept indicating a specific area.

An Infrastructure BSS includes one or more non-AP stations (non-AP STA1, non-AP STA2, non-AP STA3, non-AP STA4, and non-AP STAa) 21, 22, 23, 24, and 30, an access point (AP) which provides a distribution service, and a distribution system (DS) connecting plural APs. In the Infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing, in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to another AP or another STA to indicate a remaining time before the medium returns to an available state. Therefore, a value set to the NAV corresponds to a period reserved for the use of the medium by an AP and/or an STA transmitting a corresponding frame.

The IEEE 802.11 MAC protocol, together with a Distributed Coordination Function (DCF), provides a Hybrid Coordination Function (HCF) based on a Point Coordination Function (PCF) of performing periodical polling by using the DCF and a polling-based synchronous access method so that all reception APs or STAs or both can receive data packets. The HCF includes contention-based Enhanced Distributed Channel Access (EDCA) and HCF Controlled Channel Access (HCCA) using a contention-free-based channel access scheme employing polling mechanism as access schemes used by a provider in order to provide data packets to a plurality of users. The HCF includes a medium access mechanism for improving Quality of Service (QoS) of a WLAN, and QoS data can be transmitted in both a Contention Period (CP) and a Contention-Free Period (CFP).

The wireless communication system, due to the characteristics of the wireless medium, cannot be aware of the existence of a network when the STA powers on and starts its operation. Accordingly, an STA—no matter what type it is—should undergo a network discovery process in order to access the network. When discovering a network through the network discovery process, the STA selects a network to which the STA is to subscribe through a network selecting process. Thereafter, the STA subscribes to the selected network and performs a data exchanging operation that is done at the transmission end/reception end.

In the wireless LAN system, the network discovery process is implemented as a scanning procedure. The scanning procedure is divided into passive scanning and active scanning. The passive scanning is achieved based on a beacon frame that is periodically broadcast by the AP. In general, the AP of the wireless LAN broadcasts the beacon frame at a certain interval (e.g., every 100 msec). The beacon frame includes information on a BSS managed by the AP. The STA stands by to passively receive the beacon frame through a particular channel. When obtaining the information on the network by receiving the beacon frame, the STA ends the scanning procedure through the particular channel. Since the passive scanning is achieved only when the STA receives the beacon frame without the need of transmitting a separate frame, the overall overhead may be reduced. However, the scanning time may be increased in proportion to the transmission period of the beacon frame.

In the active scanning, the STA actively broadcasts a probe request frame on a particular channel to request network information from all the APs receiving the probe request frame. When receiving the probe request frame, the AP stands by during a random time so as to prevent frame collision and then sends a probe response frame including the network information to the corresponding STA. The STA receives the probe response frame and obtains the network information, thereby ending the scanning procedure. The active scanning may terminate the scanning within relatively a short time. On the contrary, in accordance with request-response, a frame sequence is needed, thus resulting in an increase in the overall network overhead.

When terminating the scanning procedure, the STA selects a network in accordance with a specific reference for the STA and performs an authentication procedure with the AP. The authentication procedure is done in a 2-way handshake manner. When finishing the authentication procedure, the STA proceeds with an association procedure with the AP.

The association procedure is conducted in a 2-way handshake manner. First, the STA transmits an association request frame to the AP. The association request frame includes information on the capabilities of the STA. Based on this, the AP determines whether to permit association with the corresponding STA. When determining whether to permit association, the AP sends an association response frame to the corresponding STA. The association response frame includes information indicating whether to permit association and information on the reasons for success/failure of the association. The association response frame further includes information on the capabilities that may be supported by the AP. In case the association is successfully done, frame exchange is normally conducted between the AP and the STA. In case the association fails, the association procedure is re-attempted based on the information on the failure that is included in the association response frame or the STA may send a request for association to other APs.

As a technical standard that has been relatively recently established to address the limited communication speed that has been pointed out as a weakness in the wireless LAN, there is IEEE 802.11n. IEEE 802.11n aims to increase network speed and reliability and to expand the operation distance of a wireless network. More specifically, IEEE 802.11n supports a high throughput (HT) with a data processing speed up to 540 Mbps or more and is based on Multiple Inputs and Multiple Outputs (MIMO) technology in which multi-antennas are used at both the transmission unit and reception unit so as to minimize transmission errors while optimizing data rate.

As the wireless LAN spreads and a diversity of applications using the same are introduced, a need exists for a new wireless LAN system that may support a higher throughput than that supported by IEEE 802.11n. The wireless LAN system, which supports very high throughput (VHT), is a next version of the IEEE 802.11n wireless LAN system and is among the IEEE 802.11 wireless LAN systems that have been recently suggested to support a throughput of 500 Mbps or more for a single user and a throughput of 1 Gbps or more for multiple users in an MAC service access point (SAP).

While the existing wireless LAN system supports 20 MHz or 40 MHz, the VHT wireless LAN system is to support 80 MHz, contiguous 160 MHz, non-contiguous 160 MHz bandwidth transmission and/or higher bandwidth transmission. In addition to this, the VHT wireless LAN system supports 256 Quadrature Amplitude Modulation (QAM) whereas the existing wireless LAN system supports a maximum of 64 QAM.

For a higher throughput, the VHT wireless LAN system supports a Multi User-Multiple Input Multiple Output (MU-MIMO) transmission scheme, and thus, an AP may simultaneously transmit data frames to at least one or more STAs that are MIMO-paired. The maximum number of the paired STAs may be 4, and when the maximum number of spatial streams is 8, a maximum of 4 spatial streams may be allocated to each STA.

Referring back to FIG. 1, in the wireless LAN system as shown, the AP 10 may simultaneously transmit data to an STA group including at least one or more of a plurality of STAs 21, 22, 23, 24, and 30 that are associated with the AP 10. Although in FIG. 1 the AP performs MU-MIMO transmission to the STAs, in a wireless LAN system that supports TDLS (Tunneled Direct Link Setup) or DLS (Direct Link Setup), or mesh network, an STA that intends to transmit data may send a PPDU to a plurality of STAs using an MU-MIMO transmission scheme. Hereinafter, an example where the AP transmits the PPDU to the plurality of STAs according to the MU-MIMO transmission scheme is described.

Data which is transmitted to each STA may be transmitted through different spatial streams. The data packet transmitted from the AP 10 may be referred to as a frame, such as a PPDU generated in the physical layer of the wireless LAN system and transmitted therefrom or a data field included in the PPDU. That is, the PPDU for single user (SU)-MIMO and/or MU-MIMO or the data field included in the PPDU may be referred to as the MIMO packet. Among them, the PPDU for MU may be referred to as a MU packet. In the embodiment of the present invention, it is assumed that the transmission target STA group MU-MIMO paired with the AP 10 includes the STA1 21, STA2 22, STA3 23, and STA4 24. At this time, no spatial stream is allocated to a particular STA of the transmission target STA group, so that no data may be transmitted. Meanwhile, it is assumed that the STAa 30 is an STA that is associated with the AP but is not included in the transmission target STA group.

In the wireless LAN system, an identifier may be allocated to the transmission target STA group for supporting MU-MIMO transmission, and this is referred to as a group ID. The AP transmits a group ID management frame including group definition information to the STAs supporting MU-MIMO transmission for allocating a group ID, and accordingly, the group ID is allocated to the STAs before a PPDU is transmitted. One STA may be assigned a plurality of group IDs.

Table 1 below represents information elements included in the group ID management frame:

TABLE 1

| order | information |
|---|---|
| 1 | category |
| 2 | VHT action |
| 3 | membership status |
| 4 | spatial stream position |

The category field and VHT action field are set to identify that the corresponding frame is a management frame and is a group ID management frame used in the MU-MIMO-supportive VHT wireless LAN system.

As shown in Table 1, the group definition information includes membership status information indicating whether it belongs to a specific group ID and spatial stream position information indicating, if it belongs to a corresponding group ID, what number position in the overall spatial stream according to the MU-MIMO transmission the spatial stream set of the corresponding STA corresponds to.

Since one AP manages a plurality of group IDs, the membership status information provided to one STA needs to indicate whether the STA belongs to each group ID managed by the AP. Accordingly, the membership status information may be provided in the form of an array of sub fields indicating whether it belongs to each group ID. The spatial stream position information indicates a position for each group ID, and thus, may be present in the form of an array of sub fields indicating the position of a spatial stream set occupied by the STA with respect to each group ID. Further, the membership status information and spatial stream position information for one group ID may be implemented in one sub field.

When the AP transmits a PPDU to a plurality of STAs through an MU-MIMO transmission scheme, the AP includes information indicating a group ID in the PPDU as control information. When receiving the PPDU, the STA identifies the group ID to verify whether the STA is a member STA of the transmission target STA group. If the STA is verified as a member of the transmission target STA group, it may be identified at what number of position of the overall spatial stream the spatial stream set transmitted to the STA is located. The PPDU includes the information on the number of spatial streams allocated to the receiving STA, and thus, the STA may receive data by discovering the spatial stream allocated thereto.

Meanwhile, as a frequency band newly available in the wireless LAN system, the TV White Space (WS) draws attention. The TV WS refers to an unused frequency band that remains as the analog TV turns into the digital TV in the U.S. The TV WS may include, e.g., a band of 54 to 698 MHz. However, this is merely an example, and the TV WS may be a licensed band of which a licensed user has priority in use. The licensed user means a user licensed to use the permitted band, and may also be referred to as a licensed device, primary user, or incumbent user.

The AP and/or STA operating on the TV WS should provide a function of protecting the licensed user because the licensed user has priority in use of the TV WS band. For example, in case a licensed user, e.g., a microphone, already uses a specific WS channel that is a frequency band split to have a particular bandwidth in the TV WS band in accordance with the protocol, the AP and/or STA may not use the frequency band corresponding to the corresponding WS channel so as to protect the licensed user. Further, the AP and/or STA should terminate use of the corresponding frequency band when the licensed user happens to use the licensed band that is currently used for frame transmission and/or reception.

Accordingly, the AP and/or STA should first perform a procedure of grasping whether a specific frequency band is available in the TV WS band, in other words, whether there is a licensed user in the frequency band. To grasp whether there is a licensed user in the specific frequency band is referred to as spectrum sensing. As spectrum sensing mechanisms, an energy detection scheme or a signature detection scheme is utilized. As the strength of a received signal reaches a predetermined value or more, it is determined that a licensed user is in use, or if a DTV preamble is detected, it may be determined that the licensed user is in use.

Figure 2:
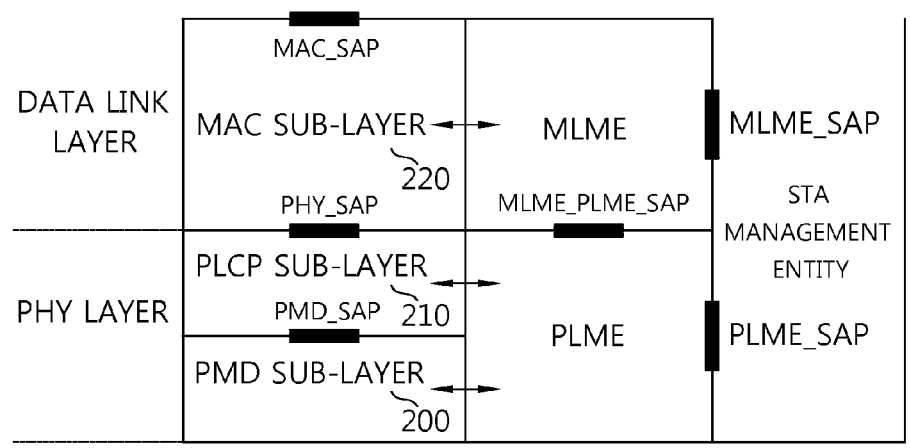
FIG. 2 is a view illustrating a physical layer architecture of a wireless LAN system supported by IEEE 802.11.

FIG. 2 is a view illustrating a physical layer architecture of a wireless LAN system supported by IEEE 802.11.

The IEEE 802.11 PHY architecture consists of a PHY Layer Management Entity (PLME), a Physical Layer Convergence Procedure (PLCP) sublayer 210, and a Physical Medium Dependent (PMD) sublayer 200. The PLME cooperates with an MAC Layer Management Entity (MLME) to provide a function of managing the physical layer. The PLCP sublayer 210 transfers an MAC Protocol Data Unit (MPDU) that is received from the MAC sublayer 220 to the PMD sublayer according to an instruction of the MAC layer between the MAC sublayer 220 and the PMD sublayer 200 or transfers a frame coming from the PMD sublayer 200 to the MAC sublayer 220. The PMD sublayer 200 is a PLCP lower layer and enables transmission and reception of a physical layer entity between two stations through a wireless medium. The MPDU transferred from the MAC sublayer 220 is called a Physical Service Data Unit (PSDU) in the PLCP sublayer 210. The MPDU is similar to the PSDU. However, in case an aggregated MPDU (A-MPDU) that is obtained by aggregating a plurality of MPDUs is transferred, each MPDU may be different from the PSDU.

The PLCP sublayer 210 adds necessary information by a physical layer transceiver in a process of receiving a PSDU from the MAC sublayer 220 and transmitting it to the PMD sublayer 200. At this time, the added fields may include, in the PSDU, a PLCP preamble, a PLCP header, and tail bits necessary to return the convolution encoder to a zero state. The PLCP sublayer 210 receives, from the MAC sublayer, a TXVECTOR parameter including control information necessary to generate and transmit the PPDU and control information necessary for the receiving STA to receive and analyze the PPDU. The PLCP sublayer 210 uses the information included in the TXVECTOR parameter when generating the PPDU including the PSDU.

The PLCP preamble serves to allow the receiver to prepare for a synchronization function and antenna diversity function before the PSDU is transmitted. The data field may include, in the PSDU, padding bits, a service field including a bit sequence for initializing the scrambler and a coded sequence in which a bit sequence added with tail bits is encoded. At this time, as an encoding scheme in accordance with encoding schemes supported by the STA receiving the PPDU, one of Binary Convolution Coding (BCC) encoding or Low Density Parity Check (LDPC) encoding may be chosen. The PLCP header may include a field that contains information on the PPDU (PLCP Protocol Data Unit) to be transmitted, which will be described below in further detail with reference to FIGS. 3 and 4.

The PLCP sublayer 210 adds the above-described fields to the PSDU to generate the PPDU (PLCP Protocol Data Unit) and transmits it to a receiving station via the PMD sublayer, and the receiving station receives the PPDU to obtain information necessary for recovering data from the PLCP preamble and the PLCP header. The PLCP sublayer of the receiving station transfers the RXVECTOR parameter including control information contained in the PLCP preamble and the PLCP header to the MAC sublayer such that it can analyze the PPDU in a receiving status and can obtain data.

Figure 3:
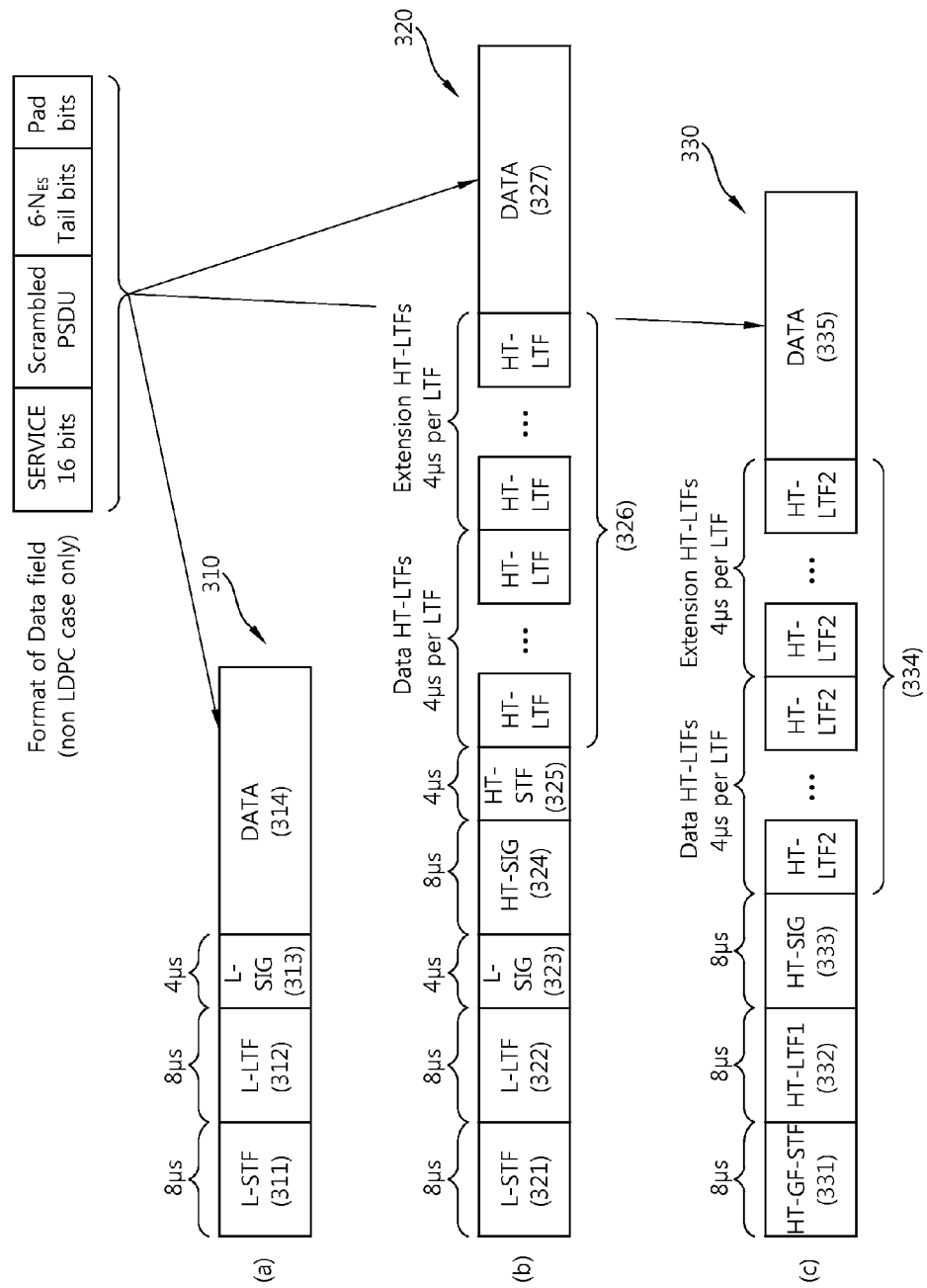
FIGS. 3 and 4 are block diagrams illustrating the format of PPDUs used in a wireless LAN system to which the embodiment of the present invention may apply.
Figure 4:
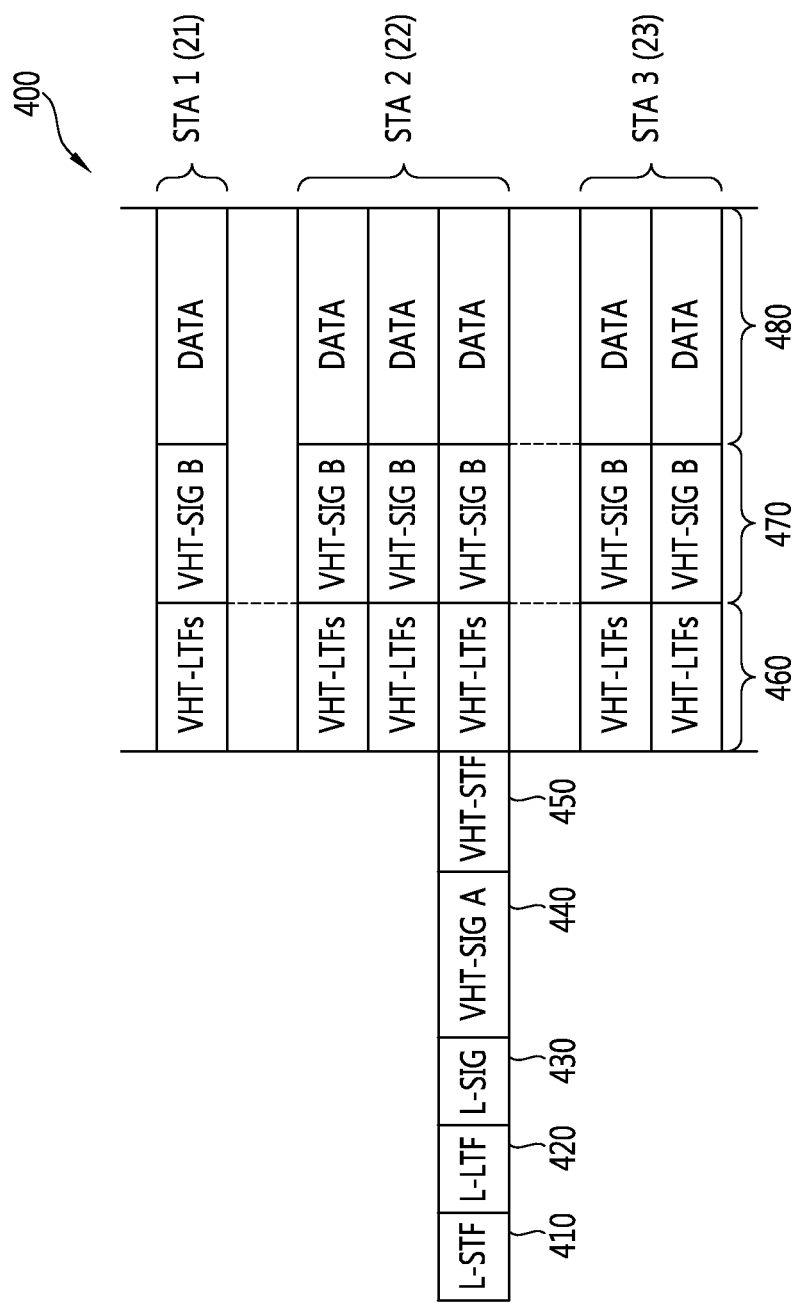

FIGS. 3 and 4 are block diagrams illustrating the format of PPDUs used in a wireless LAN system to which the embodiment of the present invention may apply. Hereinafter, the STA operating in a legacy wireless LAN system based on IEEE 802.11a/b/g, existing wireless LAN standards before IEEE 802.11n, is referred to as a legacy STA (L-STA). Further, the STA that may support the HT in an HT wireless LAN system that is based on IEEE 802.11n is referred to as an HT-STA.

FIG. 3(a) shows the format of a legacy PPDU (L-PPDU) that is a PPDU used in the existing wireless LAN system standards, IEEE 802.11a/b/g, before IEEE 802.11n. Accordingly, the legacy STA (L-STA) in the HT wireless LAN system to which the IEEE 802.11n standard applies may transmit and receive an L-PPDU having such a format.

Referring to FIG. 3(a), the L-PPDU 310 includes an L-STF 311, an L-LTF 312, an L-SIG field 313, and a data field 314.

The L-STF 311 is used for frame timing acquisition, Automatic Gain Control (AGC) convergence, and coarse frequency acquisition.

The L-LTF 312 is used for frequency offset and channel estimation.

The L-SIG field 313 includes control information for demodulating and decoding the data field 314.

The L-PPDU may be transmitted in the order of the L-STF 311, the L-LTF 312, the L-SIG field 313, and the data field 314.

FIG. 3(b) is a block diagram illustrating the format of an HT-mixed PPDU that enables an L-STA and an HT-STA to co-exist. Referring to FIG. 3(b), the HT-mixed PPDU 320 includes an L-STF 321, an L-LTF 322, an L-SIG 323, an HT-SIG 324, an HT-STF 325, and a plurality of HT-LTFs 326 and data fields 327.

The L-STF 321, the L-LTF 322, and the L-SIG field 323 are the same as the elements 311, 312, and 313, respectively, as shown in FIG. 3(a). Thus, the L-STA, although receiving the HT-mixed PPDU 320, may interpret the data field through the L-LTF 322, the L-LTF 322, and the L-SIG field 323. However, the L-LTF 322 may further include information for channel estimation that is to be performed for the HT-STA to receive the HT-mixed PPDU 320 and decipher the L-SIG field 323, the HT-SIG 324, and the HT-STF 325.

The HT-STA may be aware that the HT-mixed PPDU 320 is a PPDU for the HT-STA through the HT-SIG 324 that comes behind the L-SIG field 323, and based on this, may demodulate and decode the data fields 327.

The HT-STF 325 may be used for frame timing synchronization and AGC convergence for the HT-STA.

The HT-LTF 326 may be used for channel estimation for demodulating the data field 327. Since IEEE 802.11n supports SU-MIMO, a plurality of HT-LTFs 326 may be provided for conducting channel estimation on each of the data fields transmitted from a plurality of spatial streams.

The HT-LTFs 326 may include a data HT-LTF used for channel estimation on the spatial stream and an extension HT-LTF additionally used for full channel sounding. Accordingly, the number of the plurality of HT-LTFs 326 may be equal to or larger than the number of spatial streams transmitted.

The L-STF 321, the L-LTF 322, and the L-SIG field 323 of the HT-mixed PPDU 320 are first transmitted so that the L-STA may receive it to obtain data. Thereafter, the HT-SIG 324 is transmitted for demodulation and decoding of data transmitted for the HT-STA.

The HT-SIG 324 and the fields positioned before the HT-SIG 324 are transmitted with no beamforming being performed, so that the L-STA and the HT-STA may receive the corresponding PPDU to obtain data, and the HT-STF 325, the HT-LTFs 326 and the data fields 327 transmitted thereafter are subjected to wireless signal transmission through precoding. Here, the HT-STF 325 is transmitted and the plurality of HT-LTFs 326 and data fields 327 are then transmitted in order for an STA performing precoding and reception to take into account the part whose electric power is varied due to the precoding.

Although in the HT wireless LAN system the HT-STA adopting 20 MHz uses 52 data subcarriers per OFDM symbol, the L-STA adopting the same frequency, 20 MHz, still uses 48 data subcarriers per OFDM symbol. For supporting backward compatibility with the existing system, in the HT-mixed PPDU 320 format, the HT-SIG field 324 is decoded using the L-LTF 322, so that the HT-SIG field 324 consists of 48×2 data subcarriers. Thereafter, the HT-STF 325 and the HT-LTF 426 consists of 52 data subcarriers per OFDM symbol. As a result, the HT-SIG field 324 consists of 24 bits because it is supported with ½, Binary Phase Shift Keying (BPSK), it is transmitted as a total of 48 bits. That is, the channel estimation for the L-SIG field 323 and the HT-SIG field 324 makes use of the L-LTF 322, and the bit sequence constituting the L-LTF 322 is represented as shown in Equation 1. The L-LTF 322 consists of 48 data subcarriers per symbol, excluding a DC subcarrier:

$$L_{-26,26}\{1,1,-1,-1,1,1,-1,1,-1,1,1,1,1,1,1,-1,-1,1,1,-1,1,-1,1,1,1,1,0,1,-1,-1,1,1,-1,1,-1,1,-1,-1,1,-1,1,-1,1,1,-1,1,1,-1,1,1,-1,1,=-1,1,1,1,1\}$$ [Equation 1]

FIG. 3(c) is a block diagram illustrating the format of an HT-Greenfield PPDU 330 that may be used only by an HT-STA. Referring to FIG. 3(c), the HT-GF PPDU 330 includes an HT-GF-STF 331, an HT-LTF1 332, an HT-SIG 333, a plurality of HT-LTF2s 334 and data fields 335.

The HT-GF-STF 331 is used for frame timing acquisition and AGC.

The HT-LTF1 332 is used for channel estimation.

The HT-SIG 333 is used for demodulating and decoding the data fields 335.

The HT-LTF2 334 is used for channel estimation for demodulating the data field 335. Likewise, since the HT-STA uses SU-MIMO and thus requires channel estimation on each of the data fields transmitted through a plurality of spatial streams, a plurality of HT-LTFs 326 may be provided.

The plurality of HT-LTF2s 334, like the HT-LTFs 326 of the HT-mixed PPDU 320, may include a plurality of data HT-LTFs and a plurality of extension HT-LTFs.

Each of the data fields 314, 327, and 335 shown in FIGS. 3(a), 3(b), and 3(c) may include a service field, a scrambled PSDU, a tail bit and a padding bit. The service field may be used for initializing the scrambler. The service field may be set to have 16 bits. In such case, 7 bits may be assigned for initializing the scrambler. The tail bit may include a bit sequence necessary for turning the convolution encoder back into a zero status. The tail bit may be assigned with a bit size that is proportional to the number of Binary Convolutional Code (BCC) encoders used for encoding data to be transmitted, and more specifically, the tail bit may be implemented to have six bits per the number of BCCs.

FIG. 4 is a view illustrating an exemplary PPDU format used in a wireless LAN system that supports VHT.

Referring to FIG. 4, the PPDU 400 may include an L-STF 410, an L-LTF 420, an L-SIG field 430, a VHT-SIGA field 440, a VHT-STF 450, a VHT-LTF 460, a VHT-SIGB field 470, and a data field 480.

The PLCP sublayer constituting the PHY adds necessary information to the PSDU received from the MAC layer and converts it to the data field 480, and adds, to the converted result, fields such as the L-STF 410, the L-LTF 420, the L-SIG field 430, the VHT-SIGA field 440, the VHT-STF 450, the VHT-LTF 460, and the VHT-SIGB field 470, thereby generating the PPDU 400. The PLCP sublayer then transmits the generated PPDU 400 to one or more STAs through the PMD sublayer constituting the PHY. The control information necessary for the PLCP sublayer to generate the PPDU and the control information that is included in the PPDU and transmitted and that is used for a receiving STA to interpret the PPDU are provided from the TXVECTOR parameter that is received from the MAC layer.

The L-STF 410 is used for frame timing acquisition, Automatic Gain Control (AGC) convergence, or coarse frequency acquisition.

The L-LTF 420 is used for channel estimation for demodulating the L-SIG field 430 and the VHT-SIGA field 440.

The L-SIG field 430 is used for the L-STA to receive and interpret the PPDU 400 to obtain data. The L-SIG field 430 includes a rate sub length, a length sub field, a parity field, and a tail field. The rate sub field is set as a value that is indicative of a bit rate for data to be currently transmitted.

The length sub field is set as a value that is indicative of the octet length of the PSDU that the MAC layer requests the PHY layer to transmit. At this time, a parameter associated with information on the octet length of the PSDU, i.e., L_LENGTH parameter, is determined based on a parameter associated with a transmission time, TXTIME parameter. TXTIME refers to a transmission time determined for the PHY layer to transmit the PPDU including the PSDU corresponding to the transmission time that the MAC layer requests for transmission of the physical service data unit (PSDU). Accordingly, the L_LENGTH parameter is a time-related parameter, and thus, the length sub field included in the L-SIG field 430 happens to contain information associated with the transmission time.

The VHT-SIGA field 440 includes control information (or signal information) necessary for STAs receiving the PPDU to interpret the PPDU 400. The VHT-SIGA field 440 is transmitted as two OFDM symbols. Accordingly, the VHT-SIGA field 440 may be divided into a VHT-SIGA1 field and a VHT-SIGA2 field. The VHT-SIGA1 field includes channel bandwidth information used for transmission of the PPDU, identification information as to whether Space Time Block Coding (STBC) is used, information indicating which one of SU-MIMO and MU-MIMO is used to transmit the PPDU, information indicating a transmission target STA group including a plurality of MU-MIMO paired in case the transmission scheme is MU-MIMO, and information on a spatial stream allocated to each of the STAs included in the transmission target STA group. The VHT-SIGA2 field includes short guard interval (SGI)-related information.

The information indicative of an MIMO transmission scheme and the information indicative of a transmission target STA group may be implemented as a piece of MIMO indication information, and by way of example, may be implemented as a group ID. The group ID may be set as a value having a certain range. In case a specific value in the range indicates an SU-MIMO transmission scheme while the others in the range indicate that the PPDU 400 is transmitted in an MU-MIMO transmission scheme, the group ID may be utilized as an identifier for the corresponding transmission target STA group.

If the group ID indicates that the PPDU 400 is transmitted in an SU-MIMO transmission scheme, the VHT-SIGA2 field includes coding indication information indicative of whether the coding scheme that applies to the data field is Binary Convolution Coding (BCC) or Low Density Parity Check (LDPC) coding and modulation coding scheme (MCS) information on a transmitter-receiver channel. Further, the VHT-SIGA2 field may include an AID of a transmission target STA of the PPDU and/or a partial AID including a partial bit sequence of the AID.

If the group ID is indicative that the PPDU 400 is transmitted through the MU-MIMO transmission scheme, the VHT-SIGA field 440 includes coding indication information that indicates which one of BCC and LDPC coding applies to a data field that is intended to be transmitted to MU-MIMO paired receiving STAs. In such case, the MCS information for each receiving STA may be included in the VHT-SIGB field 470.

The VHT-STF 450 is used to enhance the performance of the AGC estimation upon MIMO transmission.

The VHT-LTF 460 is used for an STA to estimate an MIMO channel. Since the VHT wireless LAN system supports MU-MIMO, as many VHT-LTFs 460 as the number of spatial streams through which the PPDU 400 is transmitted may be set. Additionally, in case full channel sounding is supported and this is performed, the number of VHT LTFs may be increased.

The VHT-SIGB field 470 includes dedicated control information necessary for a plurality of STAs to receive the PPDU 400 to obtain data. Accordingly, only when the control information included in the VHT-SIGA field 440 indicates that the currently received PPDU 400 is the one that is MU-MIMO transmitted, the STA may be designed to decode the VHT-SIGB field 470. In contrast, in case the control information included in the VHT-SIGA field 440 indicates that the currently received PPDU 400 is provided for a single STA (including SU-MIMO), the STA may be designed not to decode the VHT-SIGB field 470.

The VHT-SIGB field 470 may include information on the MCS for each STA and information on rate-matching. Further, the VHT-SIGB field 470 may include information indicating a PSDU length included in the data field for each STA. The information indicating the length of the PSDU is information indicative of the length of the bit sequence of the PSDU and may perform the indication on a per-octet basis. Meanwhile, in case the PPDU is SU-transmitted, information on the MCS is included in the VHT-SIGA field 440, so that it may not be included in the VHT-SIGB field 470. The size of the VHT-SIGB field 470 may vary depending on the type (MU-MIMO or SU-MIMO) of MIMO transmission and the channel bandwidth used for transmission of the PPDU.

The data field 480 includes data that is intended to be transmitted to an STA. The data field 480 a PSDU where an MPDU is transferred in the MAC layer, a service field for initializing a scrambler, a tail field including a bit sequence necessary for turning the convolution encoder back into a zero state, and padding bits for standardizing the length of the data field. In the case of MU transmission, each data unit intended to be transmitted may be included in the data field 480 transmitted to each STA. The data unit may be an A-MPDU.

In case the AP 10 transmits data to the STA1 21, STA2 22, and STA3 23 in a wireless LAN system as shown in FIG. 1, a PPDU may be transmitted to an STA group including the STA1 21, the STA2 22, the STA3 23, and the STA4 24. In such a case, as shown in FIG. 4, no spatial stream may be allocate to the STA4 24 while a predetermined number of spatial streams are allocated to each of the STA1 21, the STA2 22, and the STA3 23, and data may be then transmitted. In the example illustrated in FIG. 4, it can be seen that one spatial stream, three spatial streams, and two spatial streams are allocated to the STA1 21, the STA2 22, and the STA3 23, respectively.

Figure 5:
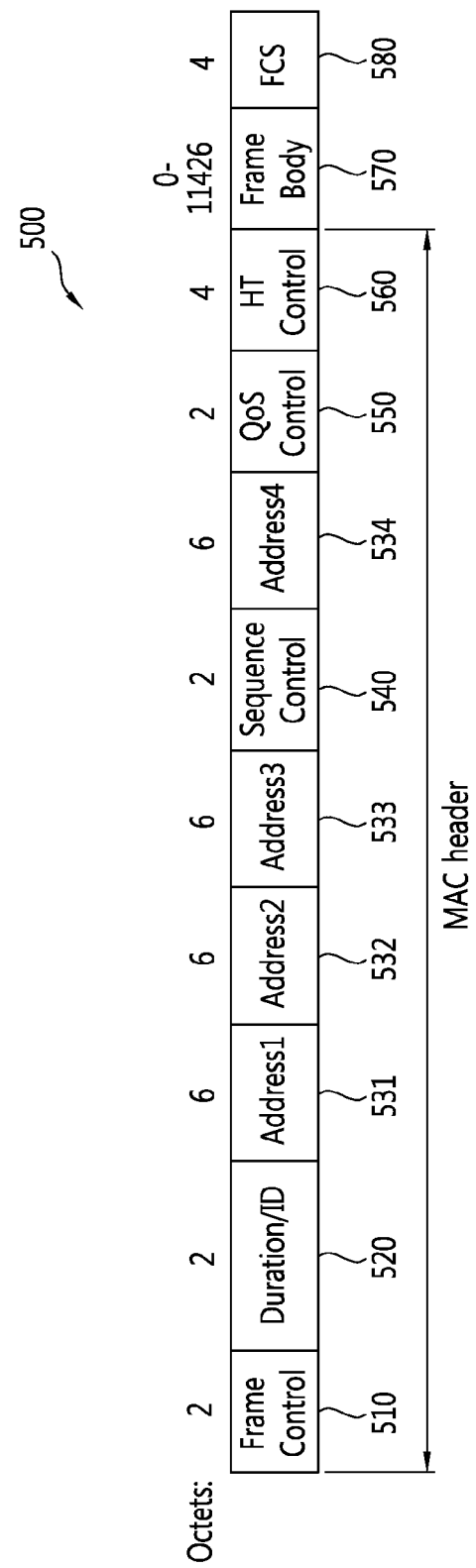
FIG. 5 is a block diagram illustrating the format of an MAC frame provided by the WLAN system.

FIG. 5 is a block diagram illustrating the format of an MAC frame provided by the WLAN system. The MAC frame may be a MPDU (which is a PSDU when transmitted to a PHY layer) included in the data field of the above-described PPDU.

Referring to FIG. 5, an MAC frame 500 includes a frame control field 510, a duration/ID field 520, an address 1 field 531, an address 2 field 532, an address 3 field 533, a sequence control field 540, an address 4 field 534, a QoS control field 550, an HT control field 560, a frame body 570, and a FCS field 580.

The frame control field 510 includes information on the characteristics of a frame. The frame control field may include protocol version information that indicates the version of the WLAN standard supported by the frame 500 and information on a type and subtype for identifying the function of the frame.

The duration/ID field 520 may be realized to have different values in accordance with the type and subtype of the frame 500. When the frame 500 is determined as the PS-poll frame for power save operation by the type and subtype of the frame 500, the duration/ID field 520 may be configured to include the AID of the STA that transmits the frame 500. In other cases, the duration/ID field 520 may be configured to have a specific duration value in accordance with the type and subtype of the frame 500. When the frame 500 is the MPDU included in an A-MPDU format, the duration/ID fields 520 included in the MAC headers of the MPDUs may be realized to have the same value.

The address 1 field to the address 4 field 531 to 534 may be configured to realize specific fields among a basic set service identification (BSSID) field for indicating BSSID, a source address (SA) field for indicating an SA, a destination address (DA) field for indicating a DA, a transmitting address (TA) field for indicating a transmitted STA address, and a receiving address (RA) field for indicating a received STA address. Meanwhile, an address field realized as a TA field may be configured to indicate a bandwidth signaling TA value. In this case, the TA field may indicate that the frame contains additional information in a scrambling sequence. The bandwidth signaling TA may be represented as a MAC address of a STA transmitting the relevant frame, and an individual/group bit in the MAC address may be set to a predetermined value, e.g. '1'.

The sequence control field 540 is configured to include a sequence number and a fragment number. The sequence number may indicate the sequence number allotted to the frame 500. The fragment number may indicate the numbers of the fragments of the frame 500.

The QoS control field 550 includes information on QoS.

The HT control field 560 includes control information on an HT transmitting and receiving method and/or a VHT transmitting and receiving method. Realization of the HT control field 560 will be described in detail hereinafter.

The frame body 570 may include data to be transmitted by a transmitted STA and/or AP. Body components excluding an MAC header and an FCS from a control frame, a management frame, an action frame, and/or a data frame to be transmitted may be realized in the frame body 570. When the frame 500 is the management frame and/or the action frame, information elements included in the management frame and/or the action frame may be realized in the frame body 570.

The FCS field 580 includes a bit sequence for cyclic redundancy check (CRC).

Hereinafter, the above-described HT control field will be described in detail with reference to the drawing.

Figure 6:
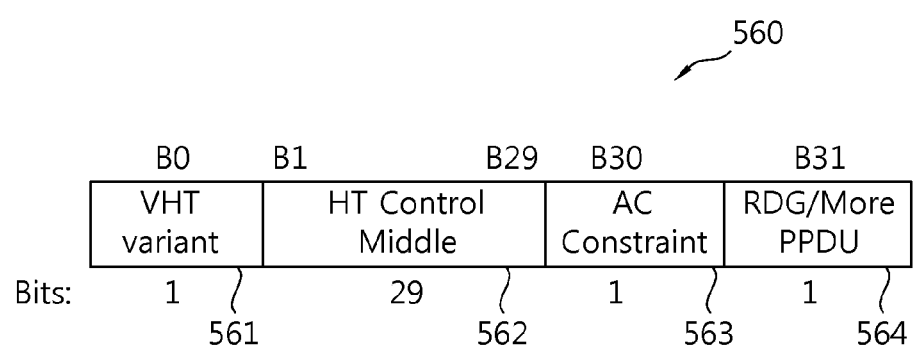
FIG. 6 is a block diagram illustrating the format of the HT control field.

FIG. 6 is a block diagram illustrating the format of the HT control field.

Referring to FIG. 6, the HT control field 560 includes a VHT variant field 561, an HT control middle field 562, an access category (AC) constraint field 563, and an RDG/More PPDU field 564.

The VHT variant field 561 indicates whether the HT control field 560 has the format of an HT control field for VHT or the format of an HT control field for HT. For example, the VHT variant field 561 may be realized by a field having the length of 1 bit. According to the value, it may be indicated whether the HT control middle field 562 is realized by the format for HT or the format for VHT.

The HT control middle field 562 may be realized to have a different format in accordance with the indication of the VHT variant field 561. Detailed realization of the HT control middle field 562 will be described in detail hereinafter.

The AC constraint field 563 indicates whether a mapped AC of a reverse direction (RD) data frame is limited to a single AC.

The RDG/More PPDU field 564 may be differently interpreted in accordance with the corresponding filed is transmitted by an RD initiator or an RD responder. In the case where the corresponding field is transmitted by the RD initiator, when the RDG/More PPDU field is set to '1', it may be interpreted that the RDG exists and may be defined by the duration/ID field. In the case where the corresponding field is transmitted by the RD responder, when the RDG/More PPDU field is set to '0', it may be interpreted as indicating that the PPDU including the field is the final frame transmitted by the RD responder. When the RDG/More PPDU field is set to '1', it may be interpreted as indicating another PPDU is transmitted following the PPDU including the field.

Figure 7:
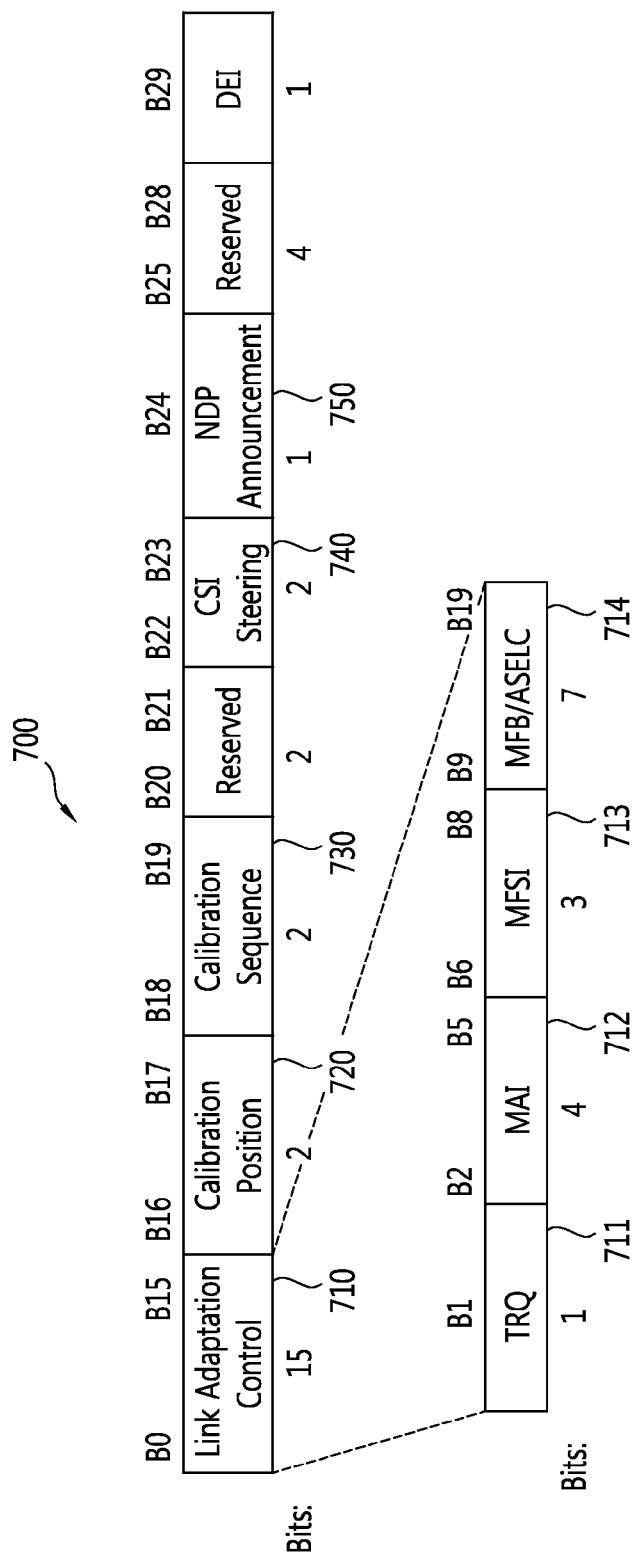
FIG. 7 is a block diagram illustrating the format of an HT variant middle field for HT.

FIG. 7 is a block diagram illustrating the format of an HT variant middle field for HT.

Referring to FIG. 7, an HT variant middle field 700 for HT includes a link adaptation control subfield 710, a calibration position sub field 720, a calibration sequence subfield 730, a channel state information (CSI)/steering subfield 740, a null data packet (NDP) announcement subfield 750.

The link adaptation control subfield 710 includes a training request (TRQ) subfield 711, a MCS request (MRQ) or antenna selection (ASEL) indication (MAI) subfield 712, an MCS feedback sequence identifier (MFSI) subfield 713, and an MCS feedback and antenna selection command/data (MFB/ASELC) subfield 714.

The TRQ subfield 711 includes information requesting a sounding responder to transmit a sounding frame. The MAI subfield 712 may include indication information requesting an MCS feedback or information indicating that the MFB/ASELC subfield 714 includes ASEL information. The MAI subfield 712 may include an MRQ sequence identifier (MSI) subfield including an MRQ indication bit and a sequence number for identifying MRQ. Whether the MCS feedback is requested may be indicated by configuring a value of a subfield. The MFSI subfield 713 may be configured by a received value of the MSI included in the frame related to the MFB information. The MFB/ASELC subfield 714 includes the MFB information or the ASEL information.

The calibration position subfield 720 and the calibration sequence subfield 730 include the position of a calibration sounding exchange sequence and identification information on a calibration sequence.

The CSI/steering subfield 740 indicates information indicating a feedback type.

The NDP announcement subfield 750 may be configured as NDP announcement indication information that announces that an NDP is to be transmitted following the currently transmitted PPDU. The NDP announcement subfield 750 may be configured by a field of 1 bit. An STA that receives a PPDU may confirm whether the corresponding PPDU is an NDPA frame through the value of the NDP announcement subfield 750.

Figure 8:
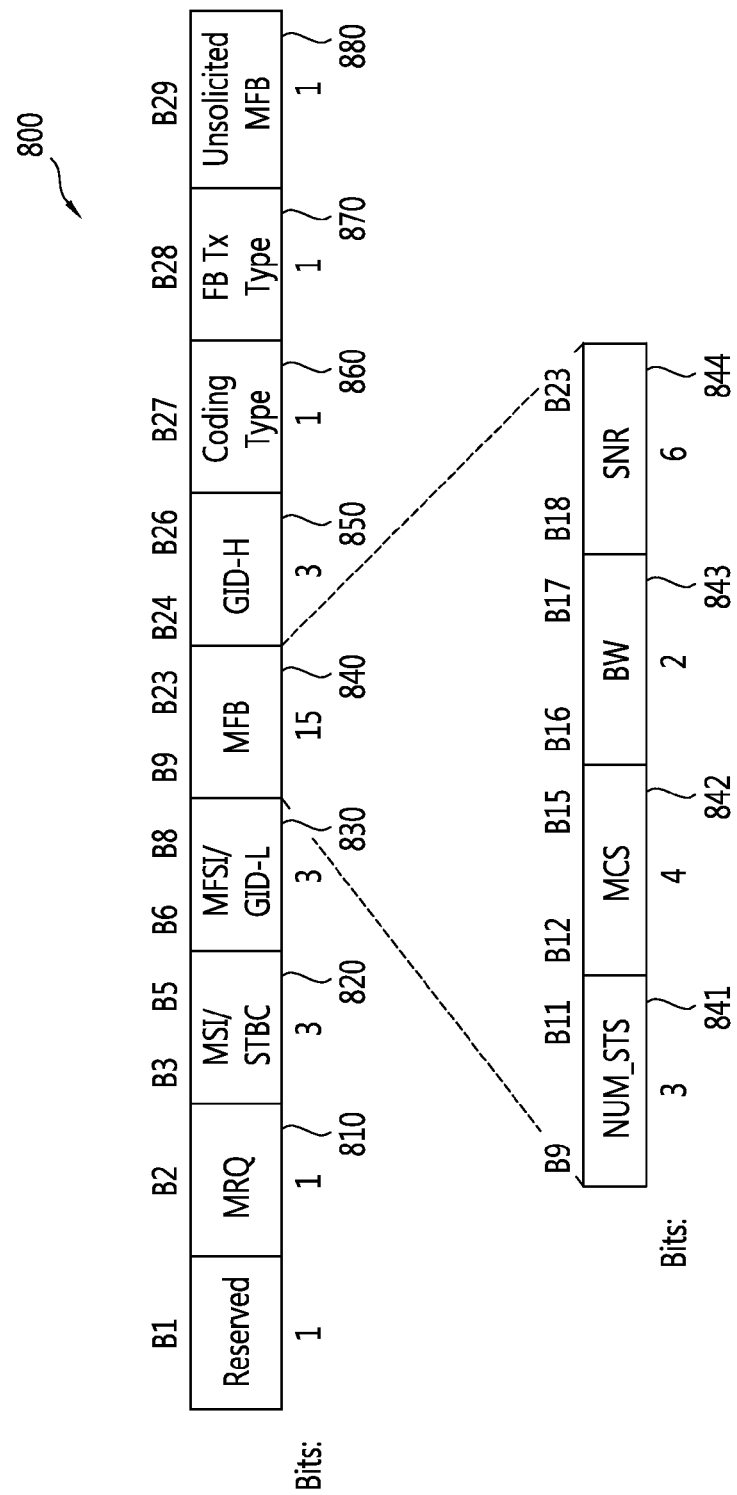
FIG. 8 is a block diagram illustrating the format of an HT variant middle field for VHT.

FIG. 8 is a block diagram illustrating the format of an HT variant middle field for VHT.

Referring to FIG. 8, an HT variant middle field 800 for VHT includes an MRQ subfield 810, an MSI subfield 820, an MFSI/GID-L subfield 830, an MFB subfield 840, a GID-H subfield 850, a coding type subfield 860, an FB Tx type subfield 870, and a unsolicited MFB subfield 880.

The MRQ subfield 810 indicates whether the MCS feedback is requested. The MRQ subfield 810 may be realized as requesting the MCS feedback set to '1'.

When the MRQ subfield 810 indicates that the MCS feedback is requested, the MSI subfield 820 includes a sequence number identifying the specific request.

The unsolicited MFB subfield 880 may indicate whether the included MFB information is a response to the MRQ. When the unsolicited MFB subfield 880 is set to '1', the included MFB information may be realized as a response to the MRQ. When the unsolicited MFB subfield 880 is set to '0', the included MFB information may be realized as not being a response to the MRQ.

The MFSI/GID-L subfield 830 may be differently interpreted in accordance with the configuration of the unsolicited MFB subfield 880. When the unsolicited MFB subfield 880 indicates that the included MFB information is a response to the MRQ, the received value of the MSI included in the frame related to the MFB information may be included. When the unsolicited MFB subfield 880 indicates that the included MFB information is not a response to the MRQ, the lowest 3 bits that configure the IDs of a group of PPDUs related to the unsolicited MFB information may be included.

The MFB subfield 840 may include recommended MFB information. The MFB subfield 840 may include a VHT N_STS subfield 841, an MCS subfield 842, a BW subfield 843, and a signal-to-noise (SNR) subfield 844. The VHT N_STS subfield 841 indicates the number of recommended spatial streams. The MCS subfield 842 indicates a recommended MCS. The BW subfield 843 indicates bandwidth information related to the recommended MCS. The SNR subfield indicates an average SNR value on data subcarriers and spatial streams.

When the unsolicited MFB subfield 880 indicates that the MFB information is not a response to the MRQ and the MFB is estimated from a PPDU for transmitting and receiving an MU, the GID-H subfield 850 may include the highest 3 bits that configure the IDs of the group of the PPDUs related to the unsolicited MFB information. When the MFB is estimated from a PPDU for SU transmission and reception, the GID-H subfield 850 may include a bit sequence set to 1.

When the unsolicited MFB subfield 880 indicates that the MFB information is not a response to the MRQ, the coding type subfield 860 may include coding information (BCC or LDPC) on the frame in which the unsolicited MFB information is estimated.

The FB Tx type subfield 870 may be configured to indicate the transmission type of an estimated PPDU. That is, the FB Tx type subfield 870 may indicate whether the estimated PPDU is beamformed.

The VHT variant field 561 may distinguish the HT control field for VHT from the HT control field for HT based on the control information included in the HT control middle field 562.

As in the next-generation WLAN system, channel allocation may be required to operate STAs operating in a 5 GHz frequency band over a non-infrastructure network or an off-channel TDLS direct link. The non-infrastructure network may refer to an IBSS/Ad-hoc network or a personal network such as Wi-Fi Peer-to-Peer (Wi-Fi P2P)/Wi-Fi Direct. The off-channel TDLS (Tunneled Direct Link Setup) direct link refers to a link on which STAs that have set up a direct link through a TDLS direct link setup protocol exchange frames with each other through channels other than the base channel of an AP with which they are associated.

As long as STAs can send and receive frames to and from each other, separately from a frame exchange with the AP, as in the TDLS direct link or non-infrastructure network, the traffic processing efficiency of the overall WLAN system can be enhanced. To this end, there is a need to suggest a protocol for channel allocation to allow both a frame exchange between STAs and a frame exchange between an AP and STAs. For example, if a channel for the frame exchange between STAs and a channel for the frame exchange between an AP and STAs overlap each other, the two types of frame exchange cannot be simultaneously performed, thus making it difficult to expect an improvement in traffic processing efficiency.

Figure 9:
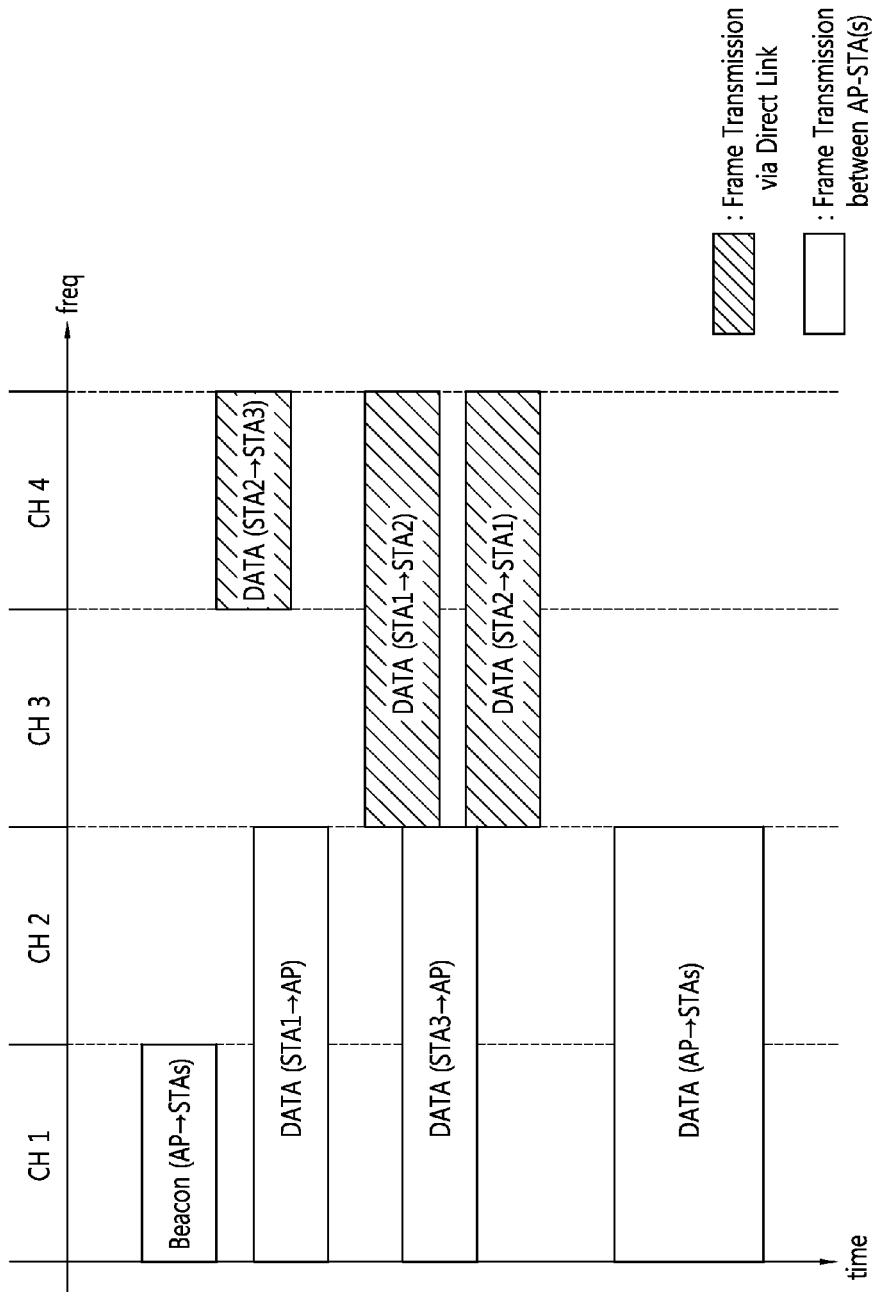
FIG. 9 is a view illustrating an example of frame exchange through independent channel allocation in a WLAN system.

FIG. 9 is a view illustrating an example of frame exchange through independent channel allocation in a WLAN system.

In the example of FIG. 9, the AP is associated with the STA1, the STA2, and the STA3, and it is assumed that a TDLS direct link is set up among the STA1, the STA2, and the STA3. Further, it is assumed that each individual channel (CH1 to CH4) has 20 MHz bandwidth, and the AP and all the STAs can use 20/40/80/160(80+80) MHz bandwidths.

Referring to FIG. 9, the channel for the frame exchange between the AP and the STAs is allocated a 40 MHz bandwidth including CH1 and CH2. Moreover, the channel for the TDLS direct link set up between the STA1 and the STA2 is allocated a 40 MHz bandwidth including CH3 and CH4, and the channel for the TDLS direct link set up between the STA2 and the STA3 is allocated 20 MHz CH4.

First of all, the AP can broadcast a beacon frame via the primary channel CH1, and the STAs can normally receive the beacon frame transmitted via CH1.

After receiving the beacon frame, the STA2 can transmit a data frame to the STA3 via the TDLS direct link based on CH4.

The STA1 can transmit data to the AP during a frame exchange via the TDLS direct link between the STA2 and the STA3. In this case, the STA1 can occupy the 40 MHz channel including CH1 and CH2 and transmit the data frame to the AP. Such data frame transmission may not cause a friction with the frame exchange between the STA2 and the STA3.

Moreover, the STA1 and the STA2 can exchange the data frame via the TDLS direct link based on the 40 MHz channel including CH3 and CH4. At the same time, the STA3 can occupy the 40 MHz channel including CH1 and CH2 and transmit the data frame to the AP. However, this may not cause a friction with the frame exchange between the AP and the STA3 and the frame exchange between the STA1 and the STA2.

The AP can occupy the 40 MHz channel including CH1 and CH2 and transmit the data frame to the STAs by MU-MIMO. This may not affect the frame change via CH3 and CH4. However, since the STAs may be target STAs of MU-MIMO transmission, a frame exchange via a TDLS direct link may not be performed during the transmission period.

Referring to the drawings, it may be necessary to allocate appropriate channels for the AP and/or the STAs in order to support efficient frame exchange between the AP and the STAs through non-infrastructure network or off-channel TDLS direct link operation. To this end, the STAs may request the AP to allocate channels for the non-infrastructure network or off-channel TDLS direct link.

As a way for effectively supporting the co-existence with the existing infrastructure networks, the STAs may request the AP for channels they will use, and the AP may provide recommended channels to the STAs upon receiving the request. Upon receiving information about the recommended channels from the AP, the STA may configure and operate a non-infrastructure network or off-channel TDLS direct link. Hereinafter, the embodiment of the present invention will be described in detail with reference to the drawings.

Figure 10:
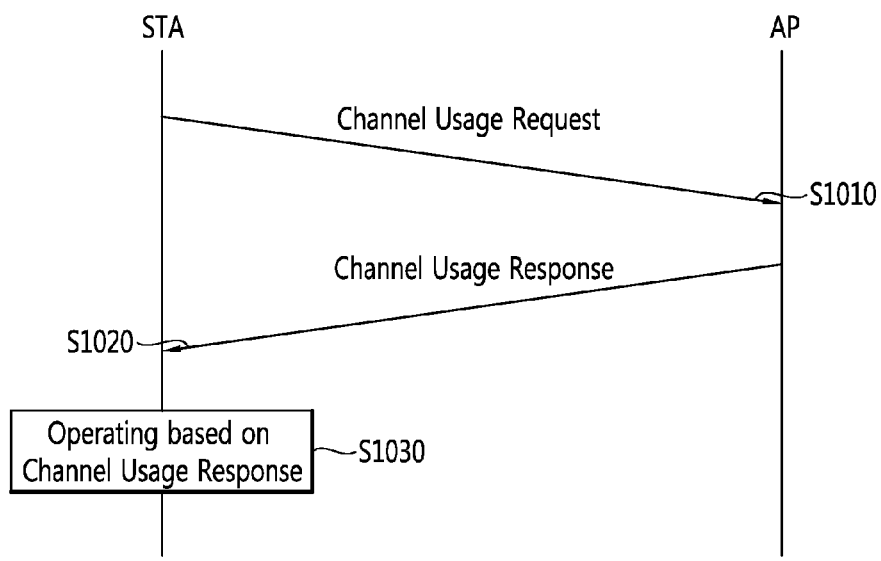
FIG. 10 is a view illustrating a communication method according to the embodiment of the present invention.

FIG. 10 is a view illustrating a communication method according to the embodiment of the present invention.

Referring to FIG. 10, an STA transmits a channel usage request to an AP in order to request channels for a non-infrastructure network operation or off-channel TDLS direct link operation (S1010).

Transmitting a channel usage request from the STA to the AP may refer to transmitting a channel usage request frame for a channel request. The transmission of the channel usage request frame may be performed in order for the STA associated with the AP to request channels. The format of the channel usage request frame is illustrated in FIG. 11.

Figure 11:
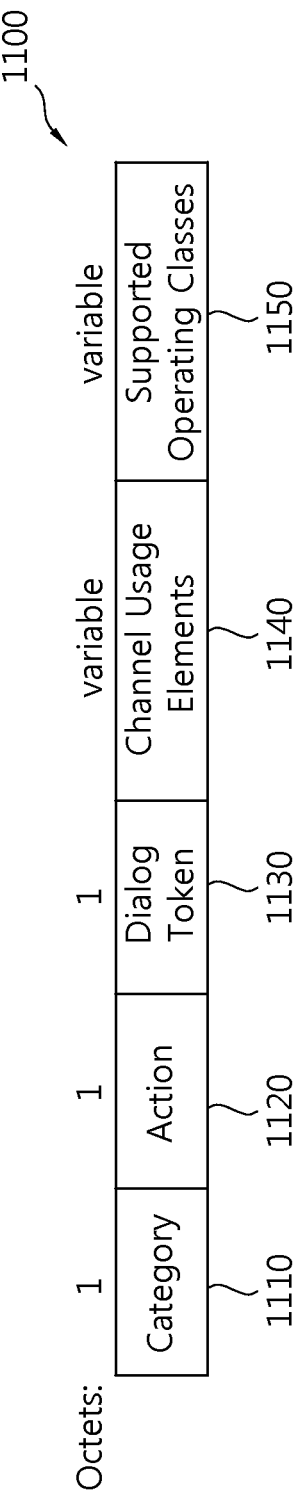
FIG. 11 is a block diagram illustrating the format of a channel usage request frame according to the embodiment of the present invention.

FIG. 11 is a block diagram illustrating the format of a channel usage request frame according to the embodiment of the present invention.

Referring to FIG. 11, a channel usage request frame 1100 may include a Category field 1110, an Action field 1120, a Dialog Token field 1130, a Channel Usage Elements field 1140, and a Supported Operating Classes field 1150.

The Category field 1110 and the Action field 1120 may be set to a value indicating that the corresponding frame is the channel usage request frame 1100.

The Dialog Token field 1130 may be set to a non-zero value that an STA transmitting the channel usage request frame 1100 has chosen to identify a request/response transaction.

The Channel Usage Elements field 1140 may include one or more Channel Usage elements for identifying a request Usage Mode. A Channel Usage element can implement channel usage request information of the STA. The format of the Channel Usage element is illustrated in FIG. 12.

Figure 12:
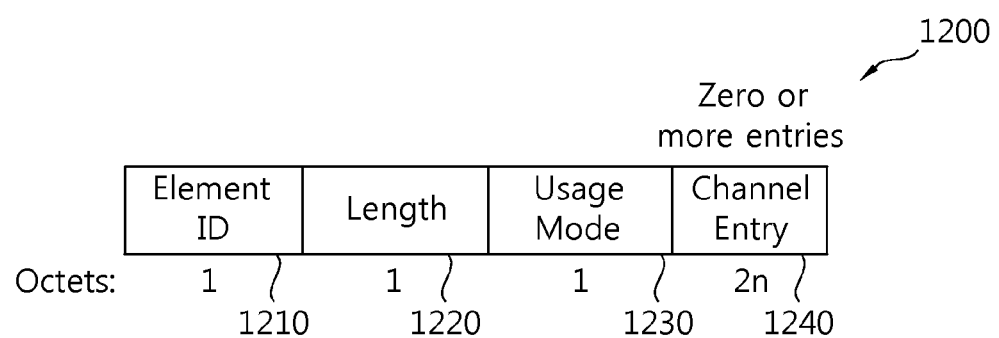
FIG. 12 is a block diagram illustrating the format of a Channel Usage element according to the embodiment of the present invention.

FIG. 12 is a block diagram illustrating the format of a Channel Usage element according to the embodiment of the present invention.

Referring to FIG. 12, a Channel Usage element 1200 includes an Element ID field 1210, a Length field 1220, a Usage Mode field 1230, and a Channel Entry field 1240.

The Element ID field 1210 may be set to an identification value indicating that that a corresponding information element is the Channel Usage information element 1200.

The Length field 1220 may indicate the length of information including the Usage Mode field 1230 and the Channel entry field 1240.

The Usage Mode field 1230 may be set to indicate a network type in which the STA wants to operate through a channel recommended by the AP. Table 2 below shows an example of the settings of the Usage Mode field 1230.

TABLE 2

| Value | Usage Mode |
|---|---|
| 0 | Noninfrastructure IEEE Std 802.11 network |
| 1 | Off-channel TDLS direct link |
| 2-255 | Reserved |

The 5 GHz band is a DFS band which requires a Dynamic Frequency Selection (DFS) function, and only an STA that supports a spectrum sensing function for a primary service such as radio signals can initiate a network. When the STA requests channel allocation, the STA may include, in the Usage Mode field, information about whether the STA itself corresponds to a DFS owner and inform the AP about this. In this case, the Usage Mode field 1230 may be set as in the following Table 3:

TABLE 3

| Value | Usage Mode |
|---|---|
| 0 | non-DFS owner noninfrastructure IEEE Std 802.11 network |
| 1 | non-DFS owner Off-channel TDLS direct link |
| 2 | DFS owner noninfrastructure IEEE Std 802.11 network |
| 3 | DPS owner Off-channel TDLS direct link |
| 4-255 | Reserved |

The Channel Entry field 1240 may include one or more operating class and channel pairs. As one or more operating class and channel pairs are set, the Channel Entry field 1240 may specify a channel that the STA requests to use.

The operating classes supported at 5 GHz correspond to 20 MHz, 40 MHz, 80 MHz, 160 MHz, and 80+80 MHz. If the STA wants to establish a personal network at 5 GHz, a 20 MHz Operating Class 'A', a 20 MHz Channel Number 'B', a 40 MHz Operating Class 'C', a 40 MHz Channel Number 'D', a 80 MHz Operating Class 'E', a 80 MHz Channel Number 'F', a 160 MHz Operating Class 'G', and a 160 MHz Channel Number 'H' may be included in the Channel Entry field 1240. That is, the Channel Entry field 1240 may include A, B, C, D, E, F, G, and H values.

Referring again to FIG. 11, the Supported Operating Classes field 1150 may include a supported operating classes information element indicating supported operating classes for a requested network type. That is, the Supported Operating Classes field 1150 may indicate operating classes supported by the STA.

Meanwhile, transmitting a channel usage request to the AP may be performed as transmitting a probe request frame including Channel Usage information and Supported Operating Classes information for a channel request. The transmission of a probe request frame containing such information may be performed in order for the STA not associated with the AP to request channels. The Channel Usage information contained in the Probe Request frame may be implemented as the Channel Usage Elements field 1140 of FIG. 11, and the Supported Operating Classes information may be implemented as the Supported Operating Classes field 1150.

Referring again to FIG. 10, upon receiving a Channel Usage Request from the STA, the AP may determine a channel that it recommends the STA to use, based on the Channel Usage Request. Accordingly, the AP can generate a Channel Usage Response to be provided to the STA.

The Channel Usage Response that the AP sends to the STA may be determine depending on whether the STA that has requested channel allocation through channel usage request information transmission supports the DFS function or not. That is, if the STA does not support the DFS function, a channel set recommended by the STA based on the Channel Usage Response has to be chosen from a channel set currently operated by the AP or from an unlicensed band. If the STA supports the DFS function, a channel set recommended by the STA based on the Channel Usage Response may be any channel set, including the channel set currently used and operated by the AP. That is, since the STA is a DFW owner, there is no regulation violation for the corresponding STA's operating in the overall DFS band.

The AP transmits a Channel Usage Response to the STA (S1020).

Transmitting the Channel Usage Response from the AP to the STA may refer to transmitting a Channel Usage Response frame in response to a Channel Usage Request frame received from the STA. The format of the Channel Usage Response frame is illustrated in FIG. 13.

Figure 13:
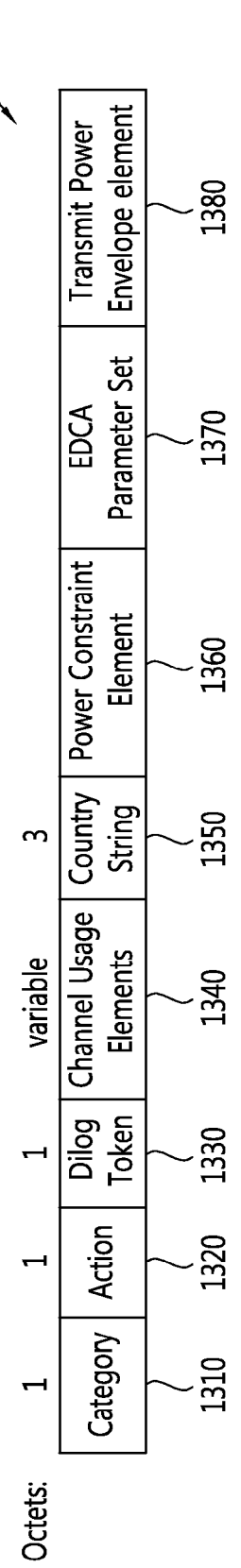
FIG. 13 is a block diagram illustrating the format of a Channel Usage Response frame according to the embodiment of the present invention.

FIG. 13 is a block diagram illustrating the format of a Channel Usage Response frame according to the embodiment of the present invention.

Referring to FIG. 13, a Channel Usage Response frame 1300 may include a Category field 1310, an Action field 1320, a Dialog Token field 1330, a Channel Usage Elements field 1340, a Country string field 1350, a Power Constraint Element field 1360, an EDCA Parameter Set field 1370, and a Transmit Power Envelope element 1380.

The Category field 1310 and the Action field 1320 may be set to a value indicating that the corresponding frame is the Channel Usage Response frame 1300.

The Dialog Token field 1330 may be set to a non-zero value if the Channel Usage Response frame 1300 is transmitted in response to the Channel Usage Request frame. The Dialog Token field 1330 may be set to 0 if the Channel Usage Response frame 1300 is transmitted for any other purpose than the response to the Channel Usage Request frame.

The Channel Usage Elements field 1340 may include zero or more Channel Usage elements. A channel Usage element may implement channel usage response information of the AP. Channel Usage elements that can be included in the Channel Usage Element field 1340 can be implemented as shown in FIG. 12. However, the Channel Entry field of the Channel Usage Element field 1340 may include one or more operating class and channel pairs, by which a channel set permitted to be used and/or an additionally recommended channel set, from the channel set requested by the STA, can be signaled to the STA.

In an example, if a specific channel from the channel set requested by the STA is not permitted to be used for personal network purpose by an enterprise network administrator, the AP can exclude the use of the corresponding channel by excluding the operating class and channel pair associated with the corresponding channel from the Channel Entry field. Also, if the AP recommends an additional channel, it can signal the additional channel to the STA by including the operating class and channel pair associated with the additional channel in the Channel Entry field.

Through the Channel Usage Element field 1340 configured as above, the channel and operating class associated with a specific usage mode can be signaled to the STA.

When the STA establishes a non-infrastructure network or an off-channel TDLS direct link, the Country String field 1350 may include a parameter for providing information about which channel set regulation requirements currently have to apply.

The Power Constraint Element field 1360 may be included in the Channel Usage Response frame 1300 or not. If included, the Power Constraint Element field 1360 may include a Power Constraint Element. The Power Constraint Element may contain the information necessary to allow the STA to determine the local maximum transmit power in the current channel.

The EDCA Parameter Set field 1370 may be included in the Channel Usage Response frame 1300 or not. If included, the EDCA Parameter Set field 1370 may include an EDCA Parameter Set element. The EDCA Parameter Set element may provide information needed by the STA for proper operation of the QoS facility during the CP.

In the 5 GHz band, the regulation requirements for the maximum transmit power level differ according to channels. Accordingly, when the AP provides a Channel Usage Response to the STA, it can provide the STA with the local maximum transmit power level for each channel bandwidth of a recommended channel set. To this end, the AP may include the Transmit Power Envelope element 1380 in the Channel Usage Response frame 1300. The format of the Transmit Power Envelope element 1380 is illustrated in FIG. 14.

Figure 14:
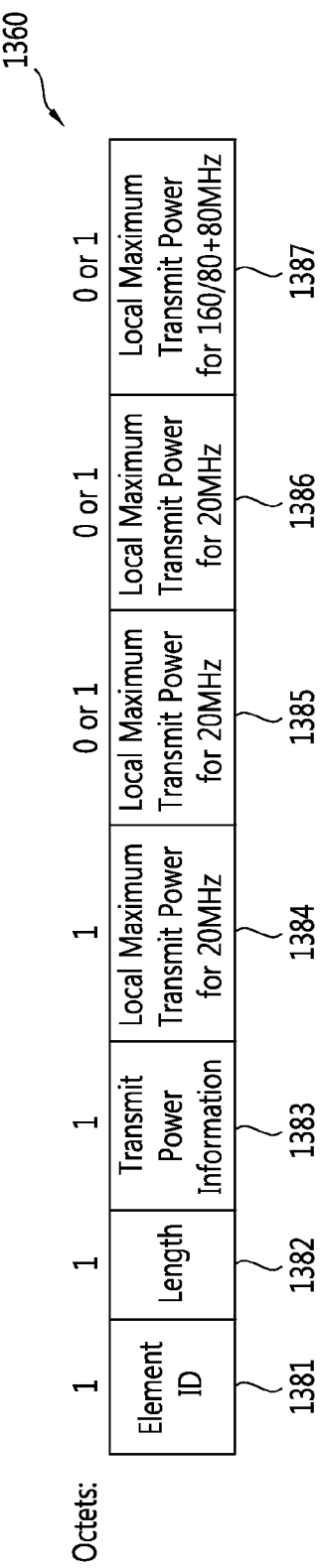
FIG. 14 is a block diagram illustrating the format of a Transmit Power Envelope element according to the embodiment of the present invention.

FIG. 14 is a block diagram illustrating the format of a Transmit Power Envelope element according to the embodiment of the present invention.

Referring to FIG. 14, the Transmit Power Envelope element 1380 may include an Element ID field 1381, a Length field 1382, a Transmit Power Information field 1383, and a Local Maximum Transmit Power for 20 MHz field 1384. Depending on the bandwidth of a recommended channel set, the Transmit Power Envelope field 1380 may further include a Local Maximum Transmit Power for 40 MHz field 1385, a Local Maximum Transmit Power for 80 MHz field 1386, and/or a Local Maximum Transmit Power for 160/80+80 MHz field 1387.

The Element ID field 1381 may be a set to an identification value for indicating that a corresponding information element is the Transmission Power Envelope element 1380.

The Length field 1382 may indicate the length of fields included in the Transmit Power Envelope element 1380, followed by the Length field 1382.

The Transmit Power Information field 1383 may contain the information associated with the number of Local Maximum Transmit Power fields included for each channel bandwidth. The format of the Transmit Power Information field 1383 is illustrated in FIG. 15.

Figure 15:
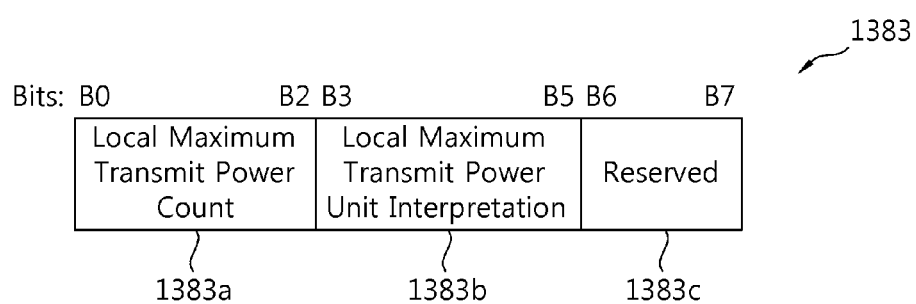
FIG. 15 is a block diagram illustrating the format of a Transmit Power Information field according to the embodiment of the present invention.

FIG. 15 is a block diagram illustrating the format of a Transmit Power Information field according to the embodiment of the present invention.

Referring to FIG. 15, the Transmit Power Information field 1383 may include a Local Maximum Transmit Power Count field 1383a and a Local Maximum Transmit Power Unit Interpretation field 1383b, and the remaining bits may be reserved bits 1383c.

The Local Maximum Transmit Power Count field 1383a may indicate the number of Local Maximum Transmit Power fields included in the Transmit Power Envelope element 1380. For example, the Local Maximum Transmit Power Count field 1383a may be set as in the following Table 4.

TABLE 4

| Value | Field(s) present |
| --- | --- |
| 0 | Local Maximum Transmit Power for 20 MHz |
| 1 | Local Maximum Transmit Power for 20 MHz |
|   | Local Maximum Transmit Power for 40 MHz |
| 2 | Local Maximum Transmit Power for 20 MHz |
|   | Local Maximum Transmit Power for 40 MHz |
|   | Local Maximum Transmit Power for 80 MHz |
| 3 | Local Maximum Transmit Power for 20 MHz |
|   | Local Maximum Transmit Power for 40 MHz |
|   | Local Maximum Transmit Power for 80 MHz |
|   | Local Maximum Transmit Power for 160/80 + 80 MHz |
| 4-7 | Reserved |

The Local Maximum Transmit Power Unit Interpretation field 1383b provides additional information for unit interpretation of Local Maximum Transmit Power fields. For example, the Local Maximum Transmit Power Unit Interpretation field 1383b may be set as in the following Table 5.

TABLE 5

| Value | Unit Interpretation of the Local Maximum Transmit Power For X MHz fields |
|---|---|
| 0 | Effective Isotropically Radiated Power (EIRP) |
| 1-7 | Reserved |

Referring again to FIG. 14, the Local Maximum Transmit Power fields 1384 to 1387 may be set to indicate the local maximum transmit power values permitted for PPDU transmission using the corresponding channel bandwidths. The value indicated by each field may be represented in the unit indicated by the Local Maximum transmit Power Unit Interpretation field 1383b. It may be represented as an EIRP value according to the illustration of Table 5.

Meanwhile, transmitting a Channel Usage Response to the STA may be performed as transmitting a probe response frame including the Channel Usage Elements field in response to a probe request frame containing Channel Usage information received from the STA. Additionally, the AP may further include, in the probe response frame, at least one of the following: the Country String field 1350, the Power Constraint Element field 1360, the EDCA Parameter Set field 1370, and the Transmit Power Envelope element 1380, in addition to the Channel Usage Elements field, in order to send a Channel Usage Response.

Referring again to FIG. 10, upon receiving the Channel Usage Response from the AP, the STA performs an operation based on the Channel Usage Response (S1030).

The STA may select and operate a channel by using the Channel Usage Elements of the Channel Usage Response when initiating a non-infrastructure network or an off-channel TDLS direct link. That is, a channel may be chosen from a recommended channel set provided through the Channel Usage Elements of the Channel Usage Response to operate a non-infrastructure network or establish and operate an off-channel TDLS direct link.

The STA may determine the maximum transmit power for configuring a non-infrastructure network or an off-channel TDLS direct link and transmitting frames, based on the Power Constraint Element field of the Channel Usage Response.

The STA may determine EDCA Parameters for configuring a non-infrastructure network or an off-channel TDLS direct link and transmitting frames, based on the EDCA Parameter Set element of the Channel Usage Response.

When acquiring the Transmit Power Envelope element through the Channel Usage Response, the STA may define the local maximum transmit power limit for the bandwidth of a selected channel based on the Channel Usage Elements. Also, the STA may configure a non-infrastructure network or an off-channel TDLS direct link and transmit frames, based on the local maximum transmit power limit for each channel bandwidth.

In the embodiment of the present invention, the AP may provide the Channel Usage Response to the STA, without a Channel Usage Request from the STA. In this case, the STA may operate the non-infrastructure network or the off-channel TDLS direct link, as described above, based on an unsolicited Channel Usage Response.

According to the above-described embodiment of the present invention, the STA may acquire appropriate channel usage information from the AP. The STA may select a channel for configuring and operating a non-infrastructure network or an off-channel TDLS direct link, which coexists with an infrastructure network, based on the channel usage information, and send and receive frames in accordance with the local maximum transmit power limit for the bandwidth of the corresponding channel. Through this procedure, STA can process traffic required to be handled between STAs while maintaining the coexistence with the infrastructure network, thereby improving the overall throughput of the WLAN system.

Figure 16:
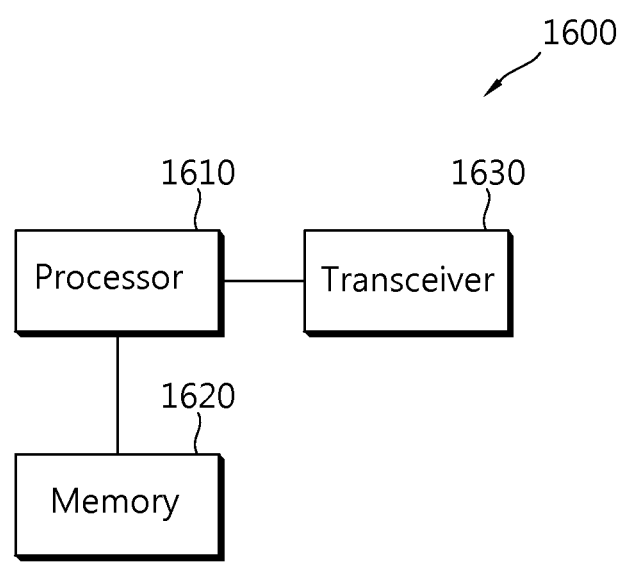
FIG. 16 is a block diagram illustrating a wireless apparatus in which the embodiment of the present invention can be implemented.

FIG. 16 is a block diagram illustrating a wireless apparatus in which the embodiment of the present invention can be implemented.

Referring to FIG. 16, a wireless apparatus 1600 includes a processor 1610, a memory 1620, and a transceiver 1630. The transceiver 1630 transmits and/or receives a wireless signal, however, the transceiver 1630 implements a physical layer of IEEE 802.11. The processor 1610 may be set to operate in functional connection with the transceiver 1630. The processor 1610 may be set to transmit a Channel Usage Request and receive a Channel Usage Response. The processor 1610 may be set to operate based on the received Channel Usage Response. The processor 1610 may be set to implement the above-described embodiment with reference to FIGS. 10 through 15.

The processor 1610 and/or transceiver 1630 may include an application-specific integrated circuit (ASIC), other chipsets, a logic circuit, and/or a data processing device. When the embodiment is implemented by software, the aforementioned technique may be implemented by modules (a processing, a function, and the like) that perform the aforementioned functions. The modules are stored in the memory 1620 and may be executed by the processor 1610. The memory 1620 may be included in the processor 1610 and may be functionally connected with the processor 1610 by various known means which is separately positioned outside.

Although in the above-exemplary system, the methods are described based on flowcharts with a series of steps or blocks, the present invention is not limited to the order thereof, and some steps may be conducted simultaneously or in an order different from other steps. It will be understood by those of ordinary skill in the art that the steps in each flowchart do not exclude each other and one or more thereof may be deleted without affecting the scope of the present invention.

What is claimed is:

1. A method of operating in a wireless local area network system, the method comprising:
   receiving, by a station, a channel usage response from an access point (AP), the channel usage response including channel usage information and transmit power regulation information; and
   operating, by the station, by using the channel usage information,
   wherein the channel usage information includes:
      a channel entry indicating a plurality of recommended channels provided by the AP for operation of a non-infrastructure network or an off-channel Tunneled Direct Link Setup (TDLS) direct link; and
      a usage mode field indicating a usage of the plurality of recommended channels listed in the channel entry,
   wherein the transmit power regulation information includes:
      a plurality of maximum transmit power fields respectively indicating a maximum transmit power for a corresponding channel bandwidth; and
      a transmit power information field indicating a number of the plurality of maximum transmit power fields,
   wherein the channel entry further identifies whether the plurality of recommended channels are contiguous or non-contiguous, wherein, if the channel entry identifies that the plurality of recommended channels are non-contiguous, the number of the plurality of maximum transmit power fields indicated by the transmit power information field is four, and wherein, if the channel entry identifies that the plurality of recommended channels are contiguous, the number of the plurality of maximum transmit power fields indicated by the transmit power information field ranges from one to four.

2. The method of claim 1, further comprising:
transmitting, by the station, a channel usage request to the AP for requesting the channel usage information,
wherein the channel usage request includes a requested usage mode field identifying a request usage mode.

3. The method of claim 1, wherein the plurality of maximum transmit power fields includes at least one field among
a maximum transmit power field for 20 MHz,
a maximum transmit power field for 40 MHz,
a maximum transmit power field for 80 MHz, and
a maximum transmit power field for 160 MHz.

4. The method of claim 1, wherein the channel usage response is transmitted in a probe response frame.

5. The method of claim 1, wherein the channel usage response is transmitted in a channel usage response frame.

6. An apparatus for a wireless local area network system, the apparatus comprising:
a transceiver configured to transmit and receive radio signals; and
a processor operatively coupled to the transceiver and configured to:
instruct the transceiver to receive a channel usage response from an access point (AP), the channel usage response including channel usage information and transmit power regulation information, the channel usage information being for coexistence with an infrastructure network, and
instruct the transceiver to operate by using the channel usage information,
wherein the channel usage information includes:
a channel entry indicating a plurality of recommended channels provided by the AP for operation of a non-infrastructure network or an off-channel Tunneled Direct Link Setup (TDLS) direct link; and
a usage mode field indicating a usage of the plurality of recommended channels listed in the channel entry,
wherein the transmit power regulation information includes:
a plurality of maximum transmit power fields respectively indicating a maximum transmit power for a corresponding channel bandwidth; and
a transmit power information field indicating a number of the plurality of maximum transmit power fields,
wherein the channel entry further identifies whether the plurality of recommended channels are contiguous or non-contiguous,
wherein, if the channel entry identifies that the plurality of recommended channels are non-contiguous, the number of the plurality of maximum transmit power fields indicated by the transmit power information field is four, and
wherein, if the channel entry identifies that the plurality of recommended channels are contiguous, the number of the plurality of maximum transmit power fields indicated by the transmit power information field ranges from one to four.

7. The apparatus of claim 6, wherein the processor is further configured to:
instruct the transceiver to transmit a channel usage request to the AP for requesting the channel usage information, and
wherein the channel usage request includes a requested usage mode field identifying a request usage mode.

8. The apparatus of claim 6, wherein the plurality of maximum transmit power fields includes at least one field among
a maximum transmit power field for 20 MHz,
a maximum transmit power field for 40 MHz,
a maximum transmit power field for 80 MHz, and
a maximum transmit power field for 160 MHz.

9. The apparatus of claim 6, Wherein the channel usage response is transmitted in a probe response frame.

10. The apparatus of claim 6, wherein the channel usage request is transmitted in a channel usage response frame.

* * * * *